March 6, 1962  M. H. MORRIS ET AL  3,023,512
ANTI-FRICTION MOUNTINGS
Filed Dec. 5, 1955  2 Sheets-Sheet 2

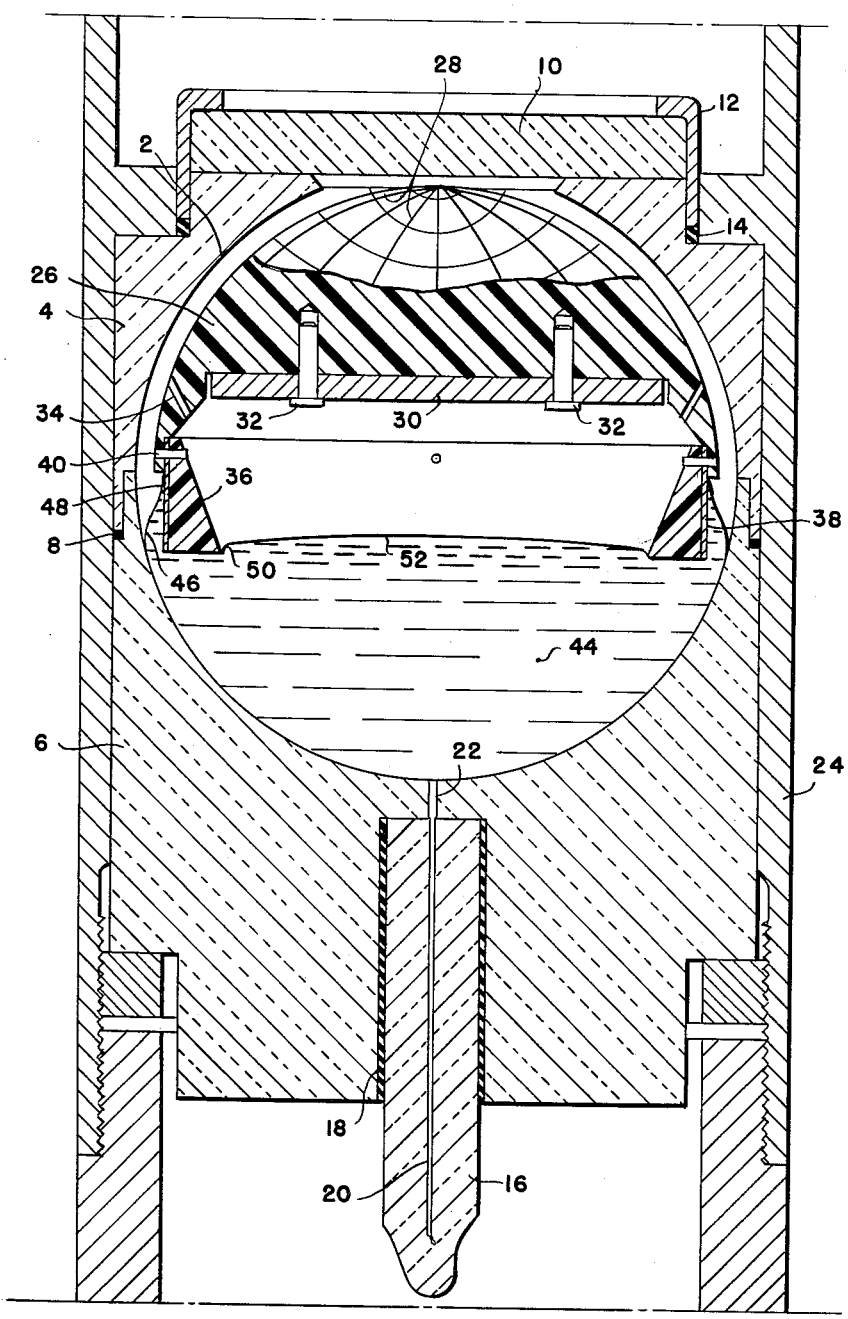
FIG. I.

INVENTORS
MARION H. MORRIS &
SAMUEL H. WILLISTON
BY
ATTORNEYS

United States Patent Office 3,023,512
Patented Mar. 6, 1962

3,023,512
ANTI-FRICTION MOUNTINGS
Marion H. Morris, Mountain View, and Samuel H. Williston, Los Altos, Calif., assignors to Sperry-Sun Well Surveying Company, Philadelphia, Pa., a corporation of Delaware
Filed Dec. 5, 1955, Ser. No. 551,024
3 Claims. (Cl. 33—206)

This invention relates to anti-friction mountings and has particular reference to mountings of universal angular movement type which are substantially completely free of static friction. In particular, the invention is applicable to the mounting of a direction and/or inclination indicating element such as is used in a well surveying instrument.

While the invention is of more general applicability, its utilization in conjunction with well surveying instruments will serve to make clear its purposes and accomplishments. In well surveying instruments accuracy of indications requires the use of direction and/or inclination elements mounted to have a high degree of sensitivity and accordingly a minimum of frictional restraint. The frictional restraint which is objectionable is of the static variety. Dynamic friction which is a function of velocity of movement is not objectionable since its only drawback would be that of increasing the time required for the movable element to come to rest. While a reasonably high speed of attainment of an equilibrium rest position is desirable, damping is also desirable to a reasonable extent to avoid continuous vibratory movements. In accordance with the foregoing, proposals have been made to provide floating indicating elements and in particular such elements as will be centered entirely free of solid portions of a housing on the supposition that such elements will be subject only to dynamic friction and will accordingly attain their equilibrium positions to a high degree of accuracy. Actually, however, such devices have been far from satisfactory. First, they have been extremely sensitive to surface tension conditions and these conditions are seriously affected even by what are apparently only monomolecular films either resulting from impurities or interactions of the solid and liquid surfaces involved. Complete insolubility of solids in liquids is extremely difficult to obtain consistent with choices of solids and liquids which may be utilized, and in general, organic liquids utilized in conjunction with solid floats have been unreliable in that after more or less extended periods disturbing conditions arise unbalancing the floats or otherwise rendering their action unreliable or erratic.

Mercury because of its high mass and surface tension characteristics has been proposed as the liquid but it also has been found extremely difficult to control. It is particularly susceptible to deterioration of its desired properties by the slightest traces of various impurities. Furthermore such impurities quite generally lead to a very substantial existence of static friction which it is particularly desired to avoid. This is due to the fact that many impurities cause the production on a mercury surface of what may be only a monomolecular film but nevertheless one which acts like an elastic membrane preventing free rotation about a vertical axis of the body floated on the mercury. At the same time, the surface tension properties are seriously changed producing, usually, asymmetric behavior so that devices which depend upon surface tension for centering become unreliable quite rapidly. In such devices dependent upon surface tension for centering, the mercury has generally been used in conjunction with solid surfaces which are non-wettable by the mercury. Combinations of wettable and non-wettable surfaces have also been proposed, but wettable surfaces are particularly sensitive to the presence of impurities from the standpoint of maintenance of characteristics. Relatively few wettable materials may be used in any event, since the majority of metals which may be wet by mercury are also soluble therein with the formation of amalgams which dissolve in the mercury adversely affecting its properties.

Equally detrimental in the use of mercury are the properties of gases in the space above the mercury. Oxygen is particularly deleterious due to the formation of oxide which provides a skin-like film on the mercury giving static friction characteristics. Other gases with which mercury would expect to have no reaction are equally deleterious, perhaps due to impurities therein or perhaps due to some physical type of reaction with the mercury itself. Even apparently pure helium has been found unsatisfactory though perhaps the difficulty experienced therewith has been due to the presence of minute amounts of hydrocarbons or other impurities which have been substantially irremovable.

One object of the present invention is the provision of anti-friction mountings of a type utilizing mercury but under conditions giving rise to high reliability.

The foregoing and other objects of the invention particularly relating to details of construction and operation will become apparent from the following description read in conjunction with the accompanying drawings in which:

FIGURE 1 is a vertical section taken through a direction and inclination indicating device for a well surveying instrument provided in accordance with the invention;

Figure 3:
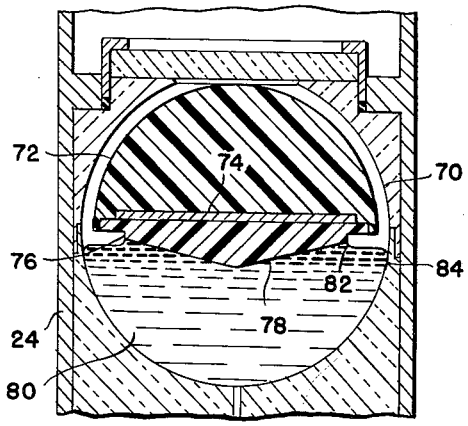
FIGURE 3 is a section similar to FIGURE 1 but showing an alternative type of float arrangement.

Referring first to FIGURE 1, there is shown therein an assembly providing a sensitive direction and inclination indicating element for use in a well surveying instrument, the element being of a type designed to be photographed to make single records in a single-shot type of instrument or multiple records in a multi-shot type of instrument. Reference may be made to the patent to Young No. 2,616,187, dated November 4, 1952, for the type of well surveying instrument in which the unit shown in FIGURE 1 may be used in substitution for the direction and inclination unit shown in said patent. Inasmuch as the present invention does not relate to other details of a surveying instrument, they are not described herein. Briefly the other elements involve timing means for controlling the time at which one or more exposures may be made, illuminating means, and camera devices for photographing the marked surface of a spherical or other member to give a record from which direction and inclination may be determined.

The unit shown in FIGURE 1 comprises a spherical cavity 2 provided in a pair of interfitting glass members 4 and 6 which are cemented together upon assembly as indicated at 8. The element 4 is provided with an opening at its upper end which is closed by a glass plate 10 provided with markings in the form of cross-hairs or other indicia indicative of the position of the axis of the instrument and unit. The plate 10 is secured in position by a ring 12 cemented in place as indicated at 14. As will appear, the cavity 2 is desirably evacuated and for this purpose there is cemented at 18 into an opening in the member 6 a capillary glass tube 16 having a bore 20 communicating with a bore 22 which opens to the cavity 2, the tube 16 being arranged to be sealed off with a torch following evacuation.

A conventional metallic housing 24 mounts the assembly, this housing being of nonmagnetic material if direction is to be indicated.

A float is located within the cavity 2 and comprises a hemispherical body 26 which may be formed of a plastic material such as nylon. The spherical surface of this element is desirably coated with a metal such as nickel, for example, by sputtering. The purpose of this is to provide for conduction to the mercury of static charges which might otherwise be generated and held asymmetrically on the surface of the float producing deviations from its proper position by electrostatic attraction. Such charges, however, are not detrimental provided they are uniform, and a coating of a metal such as nickel will provide an equipotential surface on the float and also prevent to a major extent the generation of charges by frictional contact between the float and the wall of the cavity during movement of the instrument. The surface of the member 26 is engraved with markings such as indicated at 28 arranged to be photographed with respect to the marking or markings on the plate 10 or with respect to other devices in the instrument to give indications of direction and/or inclination. Such markings may take any conventional form.

Secured within the under side of the member 26 by pins 32 is a compass needle 30 if the device is designed to indicate magnetic direction. If used for inclination indications only the compass needle may, of course, be omitted. Small bores 34 are desirably provided to insure complete equilibrium between the spaces outside and inside of the member 26, particularly during evacuation.

A ring 36 of plastic material has located on its exterior cylindrical surface a ribbon of metal which in the preferred embodiment of the invention is platinum, though other metals may be used as described below. This ribbon is applied with accurately abutting joints so as to form a smooth and substantially unbroken cylindrical surface. In a typical unit in which the spherical element 26 has a diameter of about 1 inch the platinum ribbon has a thickness of 0.004 inch. The assembled ribbon 38 and ring 36 are pressed into the cavity provided in the bottom of the member 26 and held therein by Nichrome wire pins 40. The inner surface of the ring 36 is conically tapered so as to permit any droplets of mercury to flow readily therefrom.

The float assembly just described is supported by a pool of highly purified mercury indicated at 44, the volume of mercury being approximately half the volume of the cavity 2, and at any rate being such as to support the float with its spherical surface closely concentric with the spherical surface of the cavity 2. With such a concentric arrangement, the markings may be true markings of angles and accurate indications will then be obtained.

The conditions existing at the mercury surface are indicated in FIGURE 1. The glass walls of the cavity 2, which must be perfectly clean matte surfaces, are not wetted by the mercury and accordingly where the mercury meets these walls the meniscus is convex upwardly.

The mercury wets the platinum ribbon (i.e., has a zero contact angle therewith), and accordingly where it meets this ribbon the meniscus is concave upwardly. Desirably the dimensions are such as indicated in FIGURE 1 in which the platinum ribbon surface is closely adjacent to the walls of the cavity 2. The resulting mercury surface involves, therefore, in axial section as illustrated, a substantial inclination terminating at its lower end in the meniscus 46 and at its upper end in the meniscus 48, there being in this axial section a substantial reversal of curvature.

The plastic material forming the ring 36 is not wetted by the mercury and, accordingly, the meniscus at the point of contact is convex upwardly. With a diameter of the spherical float of about one inch, the central portion of the mercury surface is substantially convex upwardly as indicated at 52.

Excellent results have been obtained by displacing all other gases from the cavity by highly purified nitrogen followed by evacuation to a pressure less than one hundred microns and desirably of the order of twenty microns. The high vacuum thus obtained is maintained by the sealing of the capillary tube 16, there being used at the joints a sealing adhesive of a type such as is commonly used for the sealing of high vacuum vessels. With all surfaces within the cavity carefully cleaned and utilizing pure mercury and pure nitrogen and evacuation as described the assembly has been highly reliable, without deterioration of the properties of the mercury even over long periods of time.

Equilibrium maintaining the float centrally located is apparently due to a considerable extent to the fact that the mercury wets the platinum surface which it contacts and by surface tension action tends to pull the float downwardly into the mercury in excess of the degree of immersion which would result solely from the weight of the float. Under these conditions equilibrium is attained only when the float is centrally located. Any tendency to move transversely results in an elevation of the center of gravity of the system, by displacement of mercury, and hence reliable return to the central equilibrium position is assured. By reason of the non-contamination of the mercury surface there is, furthermore, produced, to the extent to which observation may be made, a complete absence of static friction. In other words, in response to a magnetic field the float will assume an azimuthal position to an extremely high degree of accuracy.

Figure 2:
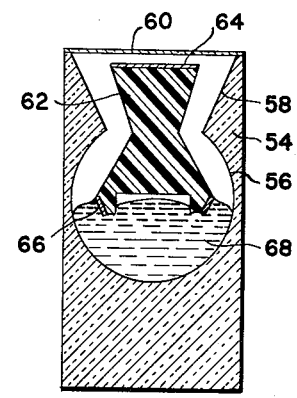
FIGURE 2 is a diagrammatic sectional view showing another form of direction and inclination indicator for a well surveying instrument, particularly adapted for the accurate measurement of small inclination angles.

The assembly indicated in FIGURE 1 is designed for recording angles of inclination up to 90°. In order to read small angles of inclination to a high degree of accuracy it is desirable to use a modified unit capable of indicating inclinations which at the maximum are of relatively small angular extent, and there is indicated in FIGURE 2 an assembly quite generally resembling that illustrated in FIGURE 1 but arranged to indicate angles up to 20° from the vertical. The construction of this unit is similar to that of FIGURE 1 and hence it will be described only generally, and is illustrated only in diagrammatic outline.

In this unit a chamber is provided in a glass assembly 54, the chamber comprising a spherical portion 56 and a conical upper continuation 58. The top of the chamber is closed by a plate 60 corresponding to the plate 10. The float in this case does not have a spherical upper surface but is provided with an extension indicated at 62 which on its horizontal transverse plane top 64 is provided with suitable markings which may be photographed in conjunction with reference markings on the plate 60. The lower portion of the float is essentially similar to that already described, there being provided a platinum surface indicated at 66 which in this case may be of conical shape converging downwardly. Floating occurs on the mercury 68 and the forces tending to the equilibrium condition are similar to those already described in connection with FIGURE 1 and are sufficient to maintain the float in vertical central position despite its "top heavy" appearance. It should, of course, be remembered that the material of the float, desirably a plastic, is much less dense than the supporting mercury. The downward pull of the mercury on the platinum surface serves to anchor the float against tilting.

FIGURE 3 shows still another modification illustrative of the application of a somewhat different principle. In this case, as in FIGURE 1, a spherical cavity 70 is provided in a glass assembly. The float comprises a spherical hemisphere 72 similar to that illustrated at 26 and carrying similar markings and associated with a compass needle 74. In this modification, however, the arrangement in contact with the mercury is quite different and comprises a member 76, of plastic or other material insoluble in, and normally considered non-wettable by mercury, which presents to the mercury 80 a conical surface 78 of large vertex angle directed downwardly. This construction provides maintenance of equilibrium and a high degree of reliability. A meniscus 82 concave upwardly is produced at the edge of the conical surface and a meniscus 84 convex upwardly is produced at the contact with the glass walls of the cavity. That this may occur, when the conical surface 78 has a large vertex angle, will be clear from reference to FIGURES 4A, 4B and 4C.

Figure 4A:
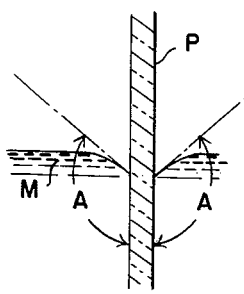
FIGURES 4A, 4B and 4C are diagrams indicative of the principles of operation involved in the type of arrangement illustrated in FIGURE 3.

Assume, as illustrated in FIGURE 4A, a plate P of a material such as glass or plastic normally considered non-wettable by mercury immersed vertically in mercury M. Under these conditions, assuming a particular material P and a particular gaseous atmosphere or vacuum above the mercury, the mercury meets the plate P with the formation of a meniscus which contacts the plate at a typical angle for the materials used such as indicated by A.

Figure 4B:
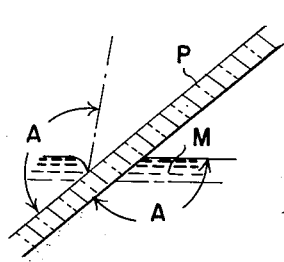

If now the plate P is tilted as indicated in FIGURE 4B so as to make with the horizontal an angle corresponding to A, the mercury will contact the under side of the plate at the same angle A but a horizontal meniscus is then involved.

Figure 4C:
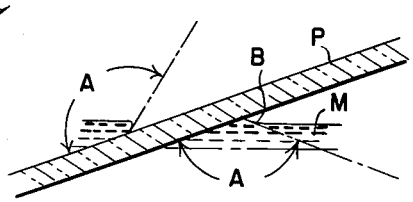

If the plate P is then further inclined as indicated in FIGURE 4C, the meniscus on the under side of the plate will still meet the plate at the same angle A, but will be concave upwardly as indicated at B. (The meniscus formed at the upper side of the plate is not of interest here but the figures show that this also remains constant at an angle A in its approach to the plate.)

The condition illustrated at the lower side of the plate in FIGURE 4C is the one of interest in conjunction with the modification shown in FIGURE 3. Despite the fact that the material of the plate P, or of the member 76 in FIGURE 3, is not wetted by mercury in the usual sense, there does exist a meniscus 82 at the point of contact which is concave upwardly, and the result is the exertion of a downward force due to surface tension on the conical surface 78 of the member 76. The result is the setting up of an equilibrium condition which is essentially the same as that involved in FIGURE 1, any deviation of the float from central position causing a rise in the center of gravity in the system and accordingly an unstable equilibrium with the result that the action is to centralize the float. Thus the shaping of the surface in contact with the mercury is equivalent to the utilization of a wetted surface of a quite different shape.

The condition of the surface of such a "non-wettable" material in contact with mercury is more significant than its material. A smooth, polished surface is desirable since a roughened or matte surface decreases the upturn of the mercury meniscus to a substantial degree.

The physical construction shown in FIGURE 3 may also be used if the member 76 is made of metal coated with platinum or other metal as described below. In such case, however, the meniscus at the float will not be at the edge of the conical surface 78 but rather at the extreme outer peripheral edge of the member 76.

Whenever a wettable metallic surface is used there is some limited choice possible. As has been above described, platinum may be used either in vacuo or in an atmosphere of pure nitrogen. The various rare metals of the platinum group, or alloys thereof may be used. For example, palladium may be used under the same conditions as platinum, though it is not quite as satisfactory in that it swells after long exposure to mercury. While the various metals of the platinum group dissolve in mercury to a substantial extent, especially at high temperatures (e.g., about 0.2% in the case of platinum or palladium), they do not oxidize to form surface oxide films and the solutions exhibit essentially the same properties as pure mercury. If a magnetic metal is permissible, iron or nickel may be used, since these metals are quite insoluble in mercury. The great majority of metals are, however, not usable since they either dissolve to too great a degree in mercury, forming solutions having unsatisfactory surface tension properties or forming amalgams or solutions which either oxidize to produce surface films or otherwise provide unsuitable mercury pools. In general, metals must be used which are insoluble in mercury, or, if slightly soluble, do not form oxide films. Silver may, for example, be used, since, while it is soluble to the extent of about 2%, the saturated solution is quite satisfactory, having properties quite similar to mercury.

As for the atmosphere involved, an evacuated pure nitrogen atmosphere has been found most practical with platinum. Apparently the inert gases could be used but they are difficult to obtain in adequately pure condition. The presence of oxygen, carbon dioxide, water vapor or hydrocarbon gases is particularly detrimental.

For the purpose of preventing asymmetric distribution of static charges the enclosure of the mercury and the float may be subjected to radioactivity, as, for example, by the inclusion of a minute quantity of a radioactive isotope of mercury in the mercury pool. Also, anti-static ingredients may be molded into, or painted onto, the plastic materials. In a photographic instrument, of course, the intensity of the radioactivity must be reduced to such level that a sensitive emulsion will not be damaged during its normal exposure to the radioactivity.

Utilizing the principles described, bearings of numerous types may be provided having the characteristics of substantial freedom from static friction and of very high accuracy of centering. Because of the high density of mercury, a very high buoyant force may be attained, so that a floating assembly may be provided for the support, for example, of a gyroscope. Obviously, the invention is applicable to the mounting of galvanometer, magnetometer or similar elements. It is to be understood, therefore, that the invention is not to be regarded as limited except as required by the following claims.

What is claimed is:

1. An antifriction mounting comprising a container presenting a spherical surface non-wettable by mercury, a pool of mercury in said container, and a float assembly floating on said pool of mercury with its center of gravity above its center of buoyancy, said float assembly presenting to the surface of the mercury a solid surface having wettable and non-wettable areas, and said mercury having a meniscus that is concave upwardly at a line of contact of said mercury surface and said wettable solid surface area, the solid surface presented to the mercury being provided by a ring having its interior surface non-wettable by mercury and its exterior surface wettable by mercury.

2. An antifriction mounting comprising a container presenting a spherical surface non-wettable by mercury, a pool of mercury in said container, and a float assembly floating on said pool of mercury with its center of gravity above its center of buoyancy, said float assembly presenting to the surface of the mercury a solid surface having wettable and non-wettable areas, and said mercury having a meniscus that is concave upwardly at a line of contact of said mercury surface and said wettable solid surface area, the solid surface presented to the mercury being provided by a plastic ring non-wettable by mercury and provided with an external band wettable by mercury.

3. An antifriction mounting comprising a container presenting a spherical surface non-wettable by mercury, a pool of mercury in said container, and a float assembly floating on said pool of mercury with its center of gravity above its center of buoyancy, said float assembly presenting to the surface of the mercury a solid surface in the form of a ring having wettable and non-wettable areas, and said mercury having a meniscus that is concave upwardly at a line of contact of said mercury surface and said wettable solid surface area, the wettable area being a ring on the exterior surface of the first ring.

References Cited in the file of this patent

UNITED STATES PATENTS

| | | |
|---|---|---|
| 1,294,710 | Roland | Feb. 18, 1919 |
| 1,912,358 | Bush | June 6, 1933 |
| 2,246,519 | Jones | June 24, 1941 |
| 2,616,187 | Young | Nov. 4, 1952 |
| 2,644,242 | Hewitt | July 7, 1953 |
| 2,830,381 | Morris | Apr. 15, 1958 |
| 2,927,765 | Morris | Mar. 8, 1960 |